United States Patent
Borras

(10) Patent No.: US 8,368,657 B2
(45) Date of Patent: Feb. 5, 2013

(54) TOUCH SENSOR PANEL USING REGIONAL AND LOCAL ELECTRODES TO INCREASE NUMBER OF SENSE LOCATIONS

(75) Inventor: Rodrigo L. Borras, Marshalltown, IA (US)

(73) Assignee: Freescale Semiconductor, Inc., Austin, TX (US)

( * ) Notice: Subject to any disclaimer, the term of this patent is extended or adjusted under 35 U.S.C. 154(b) by 788 days.

(21) Appl. No.: 12/325,721

(22) Filed: Dec. 1, 2008

(65) Prior Publication Data

US 2010/0134422 A1 Jun. 3, 2010

(51) Int. Cl.
*G06F 3/041* (2006.01)

(52) U.S. Cl. ........ 345/173; 345/174; 345/175; 345/176; 178/18.01; 178/18.03

(58) Field of Classification Search .......... 345/173–176; 178/18.01
See application file for complete search history.

(56) References Cited

U.S. PATENT DOCUMENTS

| | | | | |
|---|---|---|---|---|
| 5,463,388 | A * | 10/1995 | Boie et al. ................ | 341/33 |
| 5,488,204 | A | 1/1996 | Mead et al. | |
| 5,815,141 | A * | 9/1998 | Phares ..................... | 345/173 |
| 6,078,274 | A | 6/2000 | Inou | |
| 6,456,952 | B1 * | 9/2002 | Nathan .................... | 702/94 |
| 6,646,631 | B2 * | 11/2003 | Suzuki et al. ............. | 345/157 |
| 6,762,753 | B2 * | 7/2004 | Satoh et al. .............. | 345/177 |
| 7,176,903 | B2 * | 2/2007 | Katsuki et al. ........... | 345/173 |
| 7,202,855 | B2 | 4/2007 | Shigetaka et al. | |
| 7,233,263 | B2 * | 6/2007 | Jackson et al. ........... | 341/34 |
| 7,821,425 | B2 * | 10/2010 | Philipp .................... | 341/33 |
| 8,022,939 | B2 * | 9/2011 | Hinata ..................... | 345/173 |
| 2002/0054027 | A1 * | 5/2002 | Porter et al. ............. | 345/173 |
| 2003/0214485 | A1 * | 11/2003 | Roberts .................... | 345/173 |
| 2004/0239650 | A1 * | 12/2004 | Mackey .................... | 345/174 |
| 2007/0008299 | A1 * | 1/2007 | Hristov .................... | 345/173 |
| 2007/0279395 | A1 | 12/2007 | Philipp et al. | |
| 2008/0277259 | A1 * | 11/2008 | Chang ...................... | 200/600 |
| 2009/0091551 | A1 * | 4/2009 | Hotelling et al. .......... | 345/174 |

OTHER PUBLICATIONS

PCT Application No. PCT/US2009/065140; Search Report and Written Opinion dated Jul. 7, 2010.

* cited by examiner

*Primary Examiner* — Grant Sitta
(74) *Attorney, Agent, or Firm* — Gary Stanford

(57) ABSTRACT

An input sensor for an electronic device which includes a touch sensor panel, multiple electrodes and a sensor circuit. The electrodes include multiple regional electrodes and multiple local electrodes. Each regional electrode covers a corresponding region of the touch sensor panel and each local electrode includes multiple pads including one pad located within each of the regional electrodes. The electrodes are distributed so that a touch anywhere across the touch sensor panel is detected by at least one regional electrode and at least one local electrode. A sensor circuit determines a value for each of the electrodes indicating relative change, and compares relative values of the electrodes to identify a location of a touch of the touch sensor panel. The regional electrodes are used to determine a region of a touch and the local electrodes are used to determine a more specific touch location within the determined region.

22 Claims, 5 Drawing Sheets

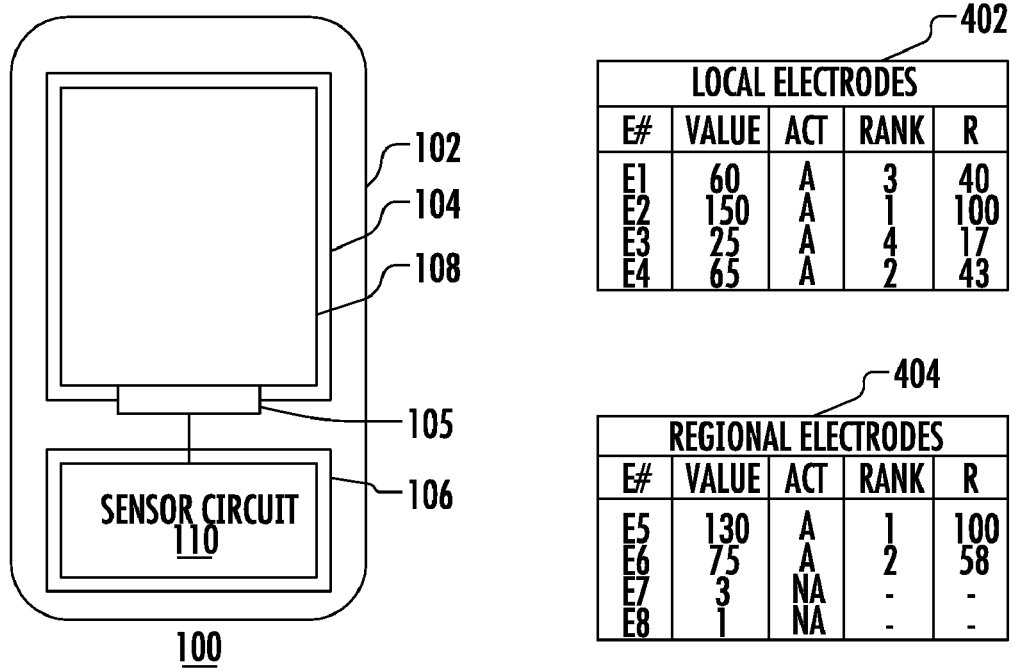
FIG. 1
FIG. 4
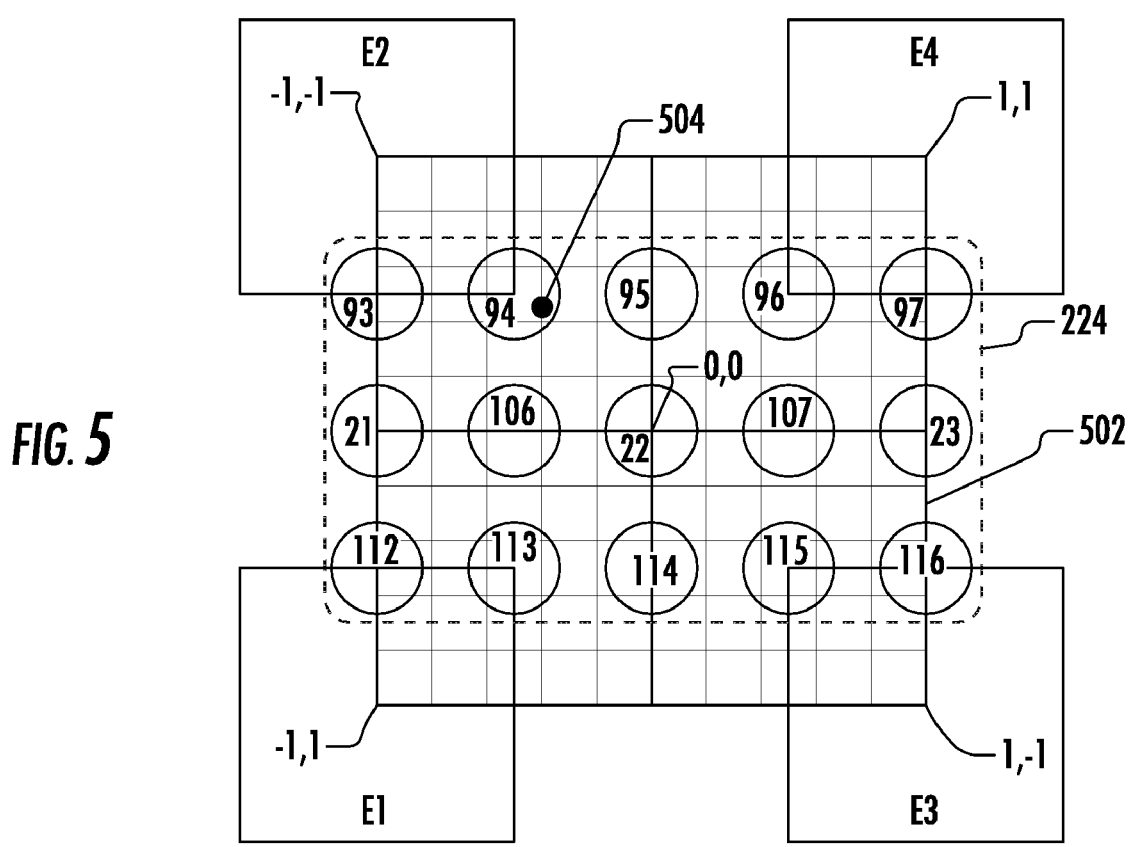
FIG. 5

TOUCH SENSOR PANEL USING REGIONAL AND LOCAL ELECTRODES TO INCREASE NUMBER OF SENSE LOCATIONS

BACKGROUND OF THE INVENTION

1. Field of the Invention

The present invention relates in general to input sensors, and more specifically to a touch sensor panel with regional and local electrodes to increase the number of sensed touch locations.

2. Description of the Related Art

Capacitive-type touch input sensors, such as touch sensor panels and the like, are relatively rugged and do not require physical pressure for detecting touch locations. Capacitive-type touch sensors, however, use relatively expensive electrodes for sensing screen touches. Conventional capacitive-type touch sensor devices with a limited number of electrodes (N) can either detect only N individual touch locations or otherwise can detect N(N+1)/2 locations with an X-Y multiplexed matrix. It is desired to increase the number of touch locations using a given number of electrodes.

BRIEF DESCRIPTION OF THE DRAWINGS

The benefits, features, and advantages of the present invention will become better understood with regard to the following description, and accompanying drawings where:

FIG. 1 is a simplified front view of an electronic device including a touch sensor panel implemented according to one embodiment;

FIG. 4 is a diagram of a pair of tables filled in with values, activity status, rank and relative ratio for four local and regional electrodes to further illustrate the weighting process;

FIG. 5 is a figurative block diagram illustrating a weighting process according to one embodiment using the numeric values from the tables of FIG. 4 as applied to the touch sensor panel of FIG. 2 to locate a corresponding point of gravity;

DETAILED DESCRIPTION

Figure 2:
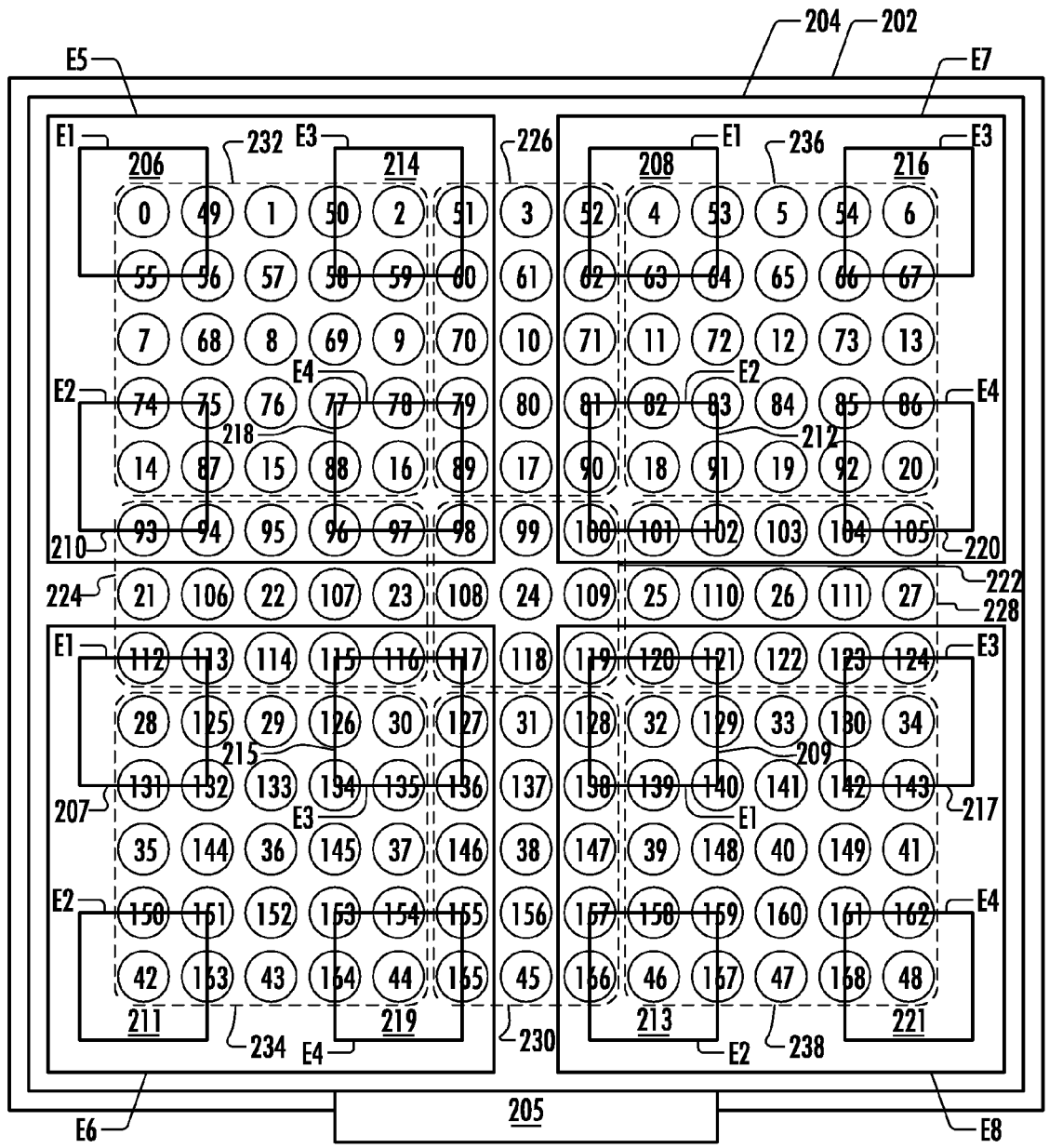
FIG. 2 is a simplified diagram of a touch sensor panel according to one embodiment which may be used as the touch sensor panel of FIG. 1.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

FIG. 1 is a simplified front view of an electronic device 100 including a touch sensor panel 104 implemented according to one embodiment. The electronic device 100 includes a body or shell 102 supporting the touch sensor panel 104 and incorporating other components and electronic circuitry 106 for performing the various functions of the electronic device 100 as readily understood by those skilled in the art. The touch sensor panel 104 includes a touch screen surface area 108 provided for displaying visual information to a user and for receiving inputs from the user. The electronic circuitry 106 includes a sensor circuit 110 electrically coupled to the touch sensor panel 104 via a suitable connector 105. The electronic device 100 may include various other input/output (I/O) interfaces, such as buttons, microphones, speakers, I/O jacks, etc., (not shown). The electronic device 100 may be implemented as a mobile or handheld device, such as a cellular phone, global-positioning system (GPS), personal digital assistant (PDA), tablet computer, etc. The touch sensor panel 104 may be implemented in other types of devices, such as kiosks, automatic teller machines (ATMs), monitors and other video devices, televisions, desktop computers, etc.

The touch sensor panel 104 includes embedded and invisible electrodes for sensing proximate touches or contact along the touch screen surface area 108 by a user, such as near-contact or direct contact by the user's finger or hand. In one embodiment, the electrodes are capacitive-type electrodes formed as conductive pads or strips on one surface of a panel or plate made of an insulating material, such as glass or plastic or the like. A conductive body which comes close to or otherwise touches or contacts the opposite surface of the panel forming the touch screen surface area 108 modifies the capacitance level measured by one or more of the electrodes as detected by the sensor circuit 110. The human body, for example, exhibits electrical characteristics including conductivity which results in capacitance changes when in close proximity of the electrodes. The sensor circuit 110 detects electrical activation or modification of one or more of the embedded electrodes and determines the location of the touch for distinguishing the intended input by the user. Thus, as a human finger comes near or otherwise contacts the touch sensor panel 104 within the touch screen surface area 108, the capacitance of one or more of the electrodes changes as detected by the sensor circuit 110. It is noted that actual contact may not be necessary and that close proximity without touching the touch screen surface area 108 may be sufficient to measure changes in capacitance and trigger activation. The location of each touch is determined by the proximity to one or more electrodes measured by relative change in value of the affected electrodes.

In one embodiment, the sensor circuit 110 scans and reads each electrode by applying a charge function, such as an electrical current, an electrical voltage, a signal frequency (e.g., a sinusoidal signal or the like), or the like, and a corresponding parameter is measured, such as current, voltage, frequency, time, etc. The measured parameter is converted to a corresponding value used to determine whether the electrode is activated, and if so, the relative amount of activation. In one embodiment, for example, each electrode is reset or grounded to zero (0) volts (V) and a predetermined current level is applied to the electrode. The voltage of the electrode is then monitored and time is measured until the voltage reaches a predetermined threshold voltage level. The amount of time the electrode takes to reach the predetermined threshold voltage level effectively measures its relative capacitance and thus its relative value. If the touch sensor panel 104 is not being touched, then each electrode has a relatively low initial or default value corresponding to a relatively low capacitance. A touch within a certain proximity of an electrode causes an increase in capacitance which results in a longer time for the electrode to reach the predetermined threshold voltage level, thereby increasing its value. In an alternative embodiment, a sinusoidal voltage with a predetermined magnitude is applied to the electrode through a resistance, which creates a voltage divider with the capacitance acting as the bottom leg. The resulting AC voltage is rectified, and the average DC value of the rectified voltage is measured. In this manner, an increase of capacitance causes a decrease of the magnitude of the sinusoidal voltage and thus a decrease of the average DC value. Although in this alternative case the average DC value is inversely proportional to capacitance, the average DC value decrease corresponds to a higher capacitive value indicating electrode activation. As described further below, the sensor circuit 110 detects which electrodes are activated, the relative value of the amount of change (e.g., the relative change of capacitance), and the corresponding location of the touch.

The absolute amount of capacitive change varies depending upon the particular configuration and the capacitance of the element touching the touch screen. Although human bodies in close proximity of the electrodes can create capacitance changes, the amount of conductivity varies from one person to the next. Also, other conditions may effect the relative amount of capacitance or conductivity. For example, a gloved finger generally causes less capacitance since the glove separates the finger from the touch screen by a slightly greater distance. It is further noted that the electrode change values do not have particular units but instead are measured in relative unit-less values, and that the values are based on relative change rather than absolute levels. For example, the finger of one person may cause an increase of 100 (value=100), whereas the finger of another person may cause an increase of 150 (value=150). Also, a gloved finger of another may have a reduced conductance causing a corresponding increase of only 75 (value=75). In any of these cases, the predetermined minimum activity threshold value is relatively low to indicate activation, such as, for example, a minimum activity threshold value of a change of 20 (minimum activity threshold value=20). Thus, values of 75, 100 or 150 all result in activation of the electrode since each is greater than 20. As further described below, if multiple electrodes are activated, the relative amount of activation is based on the electrode with the largest change or largest value.

FIG. 2 is a simplified diagram of a touch sensor panel 202 according to one embodiment which may be used as the touch sensor panel 104. The touch sensor panel 202 is generally rectangular-shaped although other shapes are contemplated, such as a square shape or a curvilinear shape. The touch sensor panel 202 is shown with a touch screen surface area 204 and an electrical connector interface 205. The touch sensor panel 202 has eight electrodes numbered E1-E8 located within the touch screen surface area 204. Although not shown, each of the electrodes E1-E8 is electrically coupled to a corresponding conductive pin or pad within the connector interface 205. The electrodes include four "local" electrodes numbered E1-E4 and four window or "regional" electrodes numbered E5-E8. Each of the regional electrodes E5-E8 are also generally rectangular (or square) and are distributed in the four quadrants of the touch screen surface area 204 of the touch sensor panel 202. As shown, the regional electrode E5 is in the upper-left quadrant, the regional electrode E6 is in the lower-left quadrant, the regional electrode E7 is in the upper-right quadrant, and the regional electrode E8 is in the lower-right quadrant.

Each of the regional electrodes E5-E8 have a size to encompass a corresponding subdivided area or region of the overall touch screen surface area 204 and are distributed so that a touch at any location of the touch screen surface area 204 activates at least one of the regional electrodes E5-E8. A touch within the boundary of any one regional electrode "activates" at least that electrode. A touch in the boundaries between each adjacent pair of the regional electrodes activates both regional electrodes. In this case, "activation" means that the electrical characteristics are modified or changed by at least a predetermined minimum activation threshold. A touch within the boundary of any one regional electrode causes a significant capacitive change of that electrode so that it is activated. A touch at a location near the boundary of a regional electrode without actually touching the regional electrode causes less than full modification. As long as the modification is above the predetermined minimum activation threshold, however, the regional electrode is said to be activated by the touch. A touch at the center of the touch screen surface area 204 activates all four regional electrodes E5-E8. As described further below, the relative levels of modification of the regional electrodes E5-E8 are used to identify a corresponding one of multiple location regions for determining a more precise determination of the actual touch location.

Each of the local electrodes E1-E4 are further subdivided into four electrode pads which are distributed within the regional electrodes E5-E8. As shown, the first local electrode E1 includes a first electrode pad 206 within the regional electrode E5, a second electrode pad 207 within the regional electrode E6, a third electrode pad 208 within the regional electrode E7, and a fourth electrode pad 209 within the regional electrode E8. In a similar manner, the second local electrode E2 includes a first electrode pad 210 within the regional electrode E5, a second electrode pad 211 within the regional electrode E6, a third electrode pad 212 within the regional electrode E7, and a fourth electrode pad 213 within the regional electrode E8. Also, the third local electrode E3 includes a first electrode pad 214 within the regional electrode E5, a second electrode pad 215 within the regional electrode E6, a third electrode pad 216 within the regional electrode E7, and a fourth electrode pad 217 within the regional electrode E8. Finally, the fourth local electrode E4 includes a first electrode pad 218 within the regional electrode E5, a second electrode pad 219 within the regional electrode E6, a third electrode pad 220 within the regional electrode E7, and a fourth electrode pad 221 within the regional electrode E8.

In one embodiment, the electrode pads located within each of the regional electrodes are distributed in a similar manner as the regional electrodes distributed within the touch screen surface area 204. The electrode pads 206-209 of electrode E1 are located in the upper-left corner of the regional electrodes E5-E8, respectively, the electrode pads 210-213 of electrode E2 are located in the lower-left corner of the regional electrodes E5-E8, respectively, the electrode pads 214-217 of electrode E3 are located in the upper-right corner of the regional electrodes E5-E8, respectively, and the electrode pads 218-221 of electrode E4 are located in the lower-right corner of the regional electrodes E5-E8, respectively. As described further below, the particular local electrode pad sequence or ordering may be changed as long as only one electrode pad of a given local electrode is not repeated within any given regional electrode. For example, the electrode pads 206-209 of local electrode E1 may be in any other one of the four positions within each of the regional electrodes E5-E8 and the same is true for the electrode pads of the remaining local electrodes E2-E4. In one embodiment, the particular electrode pad pattern is repeated within each of the regional electrodes E5-E8 so that electrode pads of the same local electrode are not adjacent each other across the borders of adjacent regional electrodes. For example, the two electrode pads 214 and 218 of the local electrodes E3 and E4, respectively, on the right side of the regional electrode E5 are adjacent the two electrode pads 208 and 212 of the local electrodes E1 and E2, respectively, on the left side of the regional electrode E7, so that no two electrode pads of the same local electrode are adjacent each other. If, instead, electrode pad 220 of local electrode E4 were in the lower-left corner of the regional electrode E7, then the electrode pads 218 and 220 of the same local electrode E4 would be vertically across each other in the vertically adjacent regional electrodes E5 and E7. It is noted that the electrode pads are likewise distributed across the borders between adjacent regional electrode pairs E5 & E6, E5 & E7, E6 & E8, and E7 & E8. Furthermore, the four electrode pads 218, 215, 212 and 209 are distributed among the local electrodes E4, E3, E2, and E1, respectively, near the center of the touch screen surface area 204.

As illustrated further below, each of the regional electrodes E5-E8 are electrically isolated from each other and from the internal local electrode pads. For example, although the electrode pads 206, 210, 214, and 218 are located within the regional electrode E5, they are electrically isolated from the regional electrode E5. The same is true for each set of electrode pads located within the regional electrodes E6-E8. Also, the electrode pads within any given regional electrode are electrically isolated from each other. Thus, the electrode pads 206, 210, 214, and 218 within the regional electrode E5 are electrically isolated from each other. The electrode pads of a given local electrode, however, are electrically coupled together. Thus, the electrode pads 206-209 of the local electrode E1 are electrically coupled together and are considered separate parts of the same local electrode E1. Similarly, the electrode pads 210-213 of the local electrode E2 are electrically coupled together and are considered separate parts of the same local electrode E2, the electrode pads 214-217 of the local electrode E3 are electrically coupled together and are considered separate parts of the same local electrode E3, and the electrode pads 218-221 of the local electrode E4 are electrically coupled together and are considered separate parts of the same local electrode E4. Electrical connection of electrode pads of a common local electrode may be made on the touch sensor panel 202 or within an externally coupled sensor circuit, such as the sensor circuit 110.

Although not shown in FIG. 2, an electrical conductive trace is connected to each of the electrodes E1-E8 and routed to a corresponding conductive connector pad or pin (not shown) on the electrical connector 205. Separate conductive traces are coupled to each of the regional electrodes E5-E8 and routed to separate pins of the electrical connector 205. In one embodiment, a separate conductive trace is coupled to each of the individual electrode pads 206-221 and routed to a separate connector pin of the electrical connector 205. Alternatively, a common conductive trace is routed between each of the four electrode pads of each local electrode and routed to a corresponding connector pin of the electrical connector 205. For example, in the alternative embodiment, a common conductive trace is routed between electrode pads 206-209 of the local electrode E1 and routed to one pin of the electrical connector 205. In one embodiment, the electrical connector 205 is configured to physically and electrically mate or otherwise interface with a compatible connector of a sensor circuit within an electronic device. For example, the electrical connector 205 mates with a suitable connector (not shown) within the electronic device 100 for electrically interfacing the sensor circuit 110. The sensor circuit scans and monitors the electrical characteristics of the electrodes E1-E8 to identify the specific location of a touch as further described below.

Multiple "touch" locations numbered 0-168 are shown as numbered circular symbols distributed across the touch screen surface area 204 of the touch sensor panel 202. The touch locations 0-168 are organized into rows and columns. The numeric sequence for touch locations 1-48 skips every other column and every other row. The first touch location 0 is located near the upper-left corner centered within the electrode pad 206 of the electrode E1. As shown, the next touch location 1 is located between electrode pads 206 and 222, the touch location 2 is centered within electrode pad 222 and so on for the first row up to the touch location 6 centered within the electrode pad 226 in the upper-right corner. The next row is skipped in the numeric sequence so that touch location 7 is located as the first touch location in the third row positioned between the electrode pads 206 and 214 of the regional electrode E5. The sequence repeats in the manner down to the touch location 48 centered within the electrode pad 212 in the lower-right corner of the regional electrode E8. The remaining touch locations 49-168 fill in the remaining rows and columns. The touch location 49 is positioned in the second location adjacent touch location 0 along the top row. The sequence repeats every other column along the top row to the second to last column for touch location 54. The touch locations 55-67 fill in the entire row second from the top row. The touch locations 68-73 fill in every other column of the third row. The sequence repeats in this manner to the last touch location 168 adjacent the touch location 48 near the lower-right corner of the touch screen surface area 204. As described further below, the eight electrodes E1-E8 are used to distinguish between each of the 169 touch locations 0-168.

The touch locations 1-168 are further grouped into touch regions determined by activation of the regional electrodes E5-E8 as further described below. A center touch region 222 includes the center touch location 24 and the immediately surrounding touch locations 98-100, 108, 109, and 117-119. Four regional border touch regions 224, 226, 228 and 230 are shown including touch locations surrounding the center region. The border touch region 224 includes touch locations along the edges or borders and in between the regional electrodes E5 and E6 that are not otherwise within the center touch region 222. Thus, the border touch region 224 includes touch locations 93-97 along the bottom of regional electrode E5, touch locations 21-23, 106, and 107 between regional electrodes E5 and E6, and touch locations 112-116 along the top border of regional electrode E6. Similarly, the border touch region 226 includes touch locations along the edges or borders and in between the regional electrodes E5 and E7 that are not otherwise within the center touch region 222. The border touch region 228 includes touch locations along the edges or borders and in between the regional electrodes E7 and E8 that are not otherwise within the center touch region 222. The border touch region 230 includes touch locations along the edges or borders and in between the regional electrodes E6 and E8 that are not otherwise within the center touch region 222. Remaining touch locations solely within regional electrode E5 are in an internal touch region 232, remaining touch locations solely within regional electrode E6 are in an internal touch region 234, remaining touch locations solely within regional electrode E7 are in an internal touch region 236, and remaining touch locations solely within regional electrode E8 are in an internal touch region 238.

The regional electrodes E5-E8 are used to distinguish among the touch regions. A touch within the center touch region 222 activates all four regional electrodes E5-E8. A touch within the touch region 224 only activates the two regional electrodes E5 and E6 whereas the regional electrodes E7 and E8 are not activated. A touch within the touch region 226 only activates the two regional electrodes E5 and E7 whereas the regional electrodes E6 and E8 are not activated. A touch within the touch region 228 activates only the two regional electrodes E7 and E8 whereas the regional electrodes E5 and E6 are not activated. A touch within the touch region 230 activates only the two regional electrodes E6 and E8 whereas the regional electrodes E5 and E7 are not activated. A touch within touch regions 232, 234, 236 and 238 activates only one regional electrode each, namely, regional electrodes E5, E6, E7, and E8, respectively.

Activation sensing is according to a relative weighting process among the electrodes. A direct touch on any given electrode causes a relatively large change of capacitance of that electrode. As the touch location moves away from the electrode, the relative capacitive change decreases until it drops below the minimum activity threshold level, in which case the electrode is no longer considered activated. Likewise, movement towards an electrode causes an increase up to a relative maximum level when the electrode is reached. The relative weighting function between the four regional electrodes E5-E8 is used to distinguish between the touch locations located within the center touch region 222. For example, consider a finger touch directly on touch location 24 within center touch region 222. Although the touch may not be directly on any one of the regional electrodes E5-E8, the touch is sufficiently close to activate all four regional electrodes E5-E8. As the finger moves horizontally left towards touch location 108, the values of regional electrodes E5 and E6 increase while the values of regional electrodes E7 and E8 decrease. Thus, regional electrodes E5 and E6 have relatively high values and regional electrodes E7 and E8 have low to medium values. If the touch then moves vertically upwards from touch location 108 towards touch location 98, the values of regional electrodes E5 and E7 increase while the values of regional electrodes E6 and E8 decrease. In this manner, at about touch location 98, regional electrode E5 has a relatively high value, regional electrodes E6 and E7 have roughly equivalent medium values, and regional electrode E8 has a relatively low value. If the touch then moves horizontally right towards touch location 99, the values of regional electrodes E5 and E6 decrease and the values of regional electrodes E7 and E8 increase. At touch location 99, the values of regional electrodes E5 and E7 are relatively high and roughly equal to each other, whereas the values of regional electrodes E6 and E8 are relatively low or medium and also roughly equal to each other. In this manner, the relative weight of values of the regional electrodes E5-E8 may be used to distinguish between each of the touch locations 98-100, 108, 24, 109, and 117-119 within the center touch region 222.

The relative weighting function between the four regional electrodes E5-E8 is also used to distinguish between the touch regions 224-238. A touch within touch region 232 only activates regional electrode E5. Similarly, touches within touch regions 234, 236 and 238 activate only regional electrodes E6, E7 and E8, respectively. As a touch moves horizontally from touch region 232 towards touch region 226, the relative value of regional electrode E6 increases until it is activated when the touch enters the touch region 226. As the touch continues to move towards touch region 236 within the regional electrode E6, the value of regional electrode E6 increases while the value of regional electrode E5 decreases. The values of regional electrodes E5 and E6 are roughly equal when the touch is between regional electrodes E5 and E6. As the touch continues to move towards touch region 236 from within touch region 226, the value of regional electrode E5 decreases and regional electrode E5 eventually becomes deactivated when the touch enters touch region 236. In this manner, the relative values between the regional electrodes E5 and E6 may be used to distinguish between the three columns of touch locations within the touch region 226. The same is true for distinguishing between any of the intermediate touch regions 224, 226, 228 and 230.

The relative weighting function between the four local electrodes E1-E4 is used to distinguish between the specific touch locations within any of the touch regions 224-238. The relative weighting function between the four local electrodes E1-E4 may also be used to verify the specific touch locations within the center touch region 222. Each of the touch regions 232, 234, 236 and 238 have central regions that are distinguished using relative weight between the local electrodes E1-E4 in substantially the same manner as distinguishing between the touch locations within the center touch region 222 using the relative weight of the regional electrodes E5-E8. For example, a touch at touch location 8 at the center of the touch region 232 causes roughly equal values of the local electrodes E1-E4. As the touch is moved horizontally left from touch location 8 towards touch location 68, the values of local electrodes E1 and E2 increase while the values of local electrodes E3 and E4 decrease. At touch location 68, the local electrodes E1 and E2 have relatively high and roughly equal values whereas the local electrodes E3 and E4 have relatively low and roughly equal values. As the touch moves from touch location 68 to touch location 56, the local electrode E1 has a high value, the local electrodes E2 and E3 have roughly equal medium values, and the local electrode E4 has a relatively low value. Furthermore, a touch at location 0 causes only the regional electrode E5 and the local electrode E1 to be activated while the remaining electrodes are inactive. As the touch moves horizontally to the right, local electrode E3 activates and its value increases while the value of local electrode E1 decreases. The values of local electrodes E1 and E3 are roughly equal at touch location 1, and only local electrode E3 is activated at location 2 at the center of local electrode E3.

A similar weighting process applies within the touch region 226. The touch location 10 is determined as an equal activation weight of regional electrodes E5 and E6, a roughly equal activation weight of local electrodes E1-E4, and non-activation of regional electrodes E6 and E8. Note that the relative activation of the local electrodes E1-E4 is substantially the same for touch locations 8 and 10, where the touch location 10 is distinguished from touch location 8 based on the relative activation of the regional electrodes E5 and E7 (both are active with roughly equal values at touch location 10, whereas only regional electrode E5 is active for touch location 8). All of the touch locations within the touch region 226 are distinguished based on the relative weight of the local electrodes E1-E4. For example, as the touch is moved horizontally left from touch location 10 towards touch location 70, the values of local electrodes E3 and E4 increase while the values of local electrodes E1 and E2 decrease. At touch location 70, the local electrodes E1 and E2 have relatively low and roughly equal values whereas the local electrodes E3 and E4 have relatively high and roughly equal values. As the touch moves from touch location 70 to touch location 60, the local electrode E3 becomes a high value, the local electrodes E1 and E4 have roughly equal medium values, and the local electrode E2 has a relatively low value.

Figure 3:
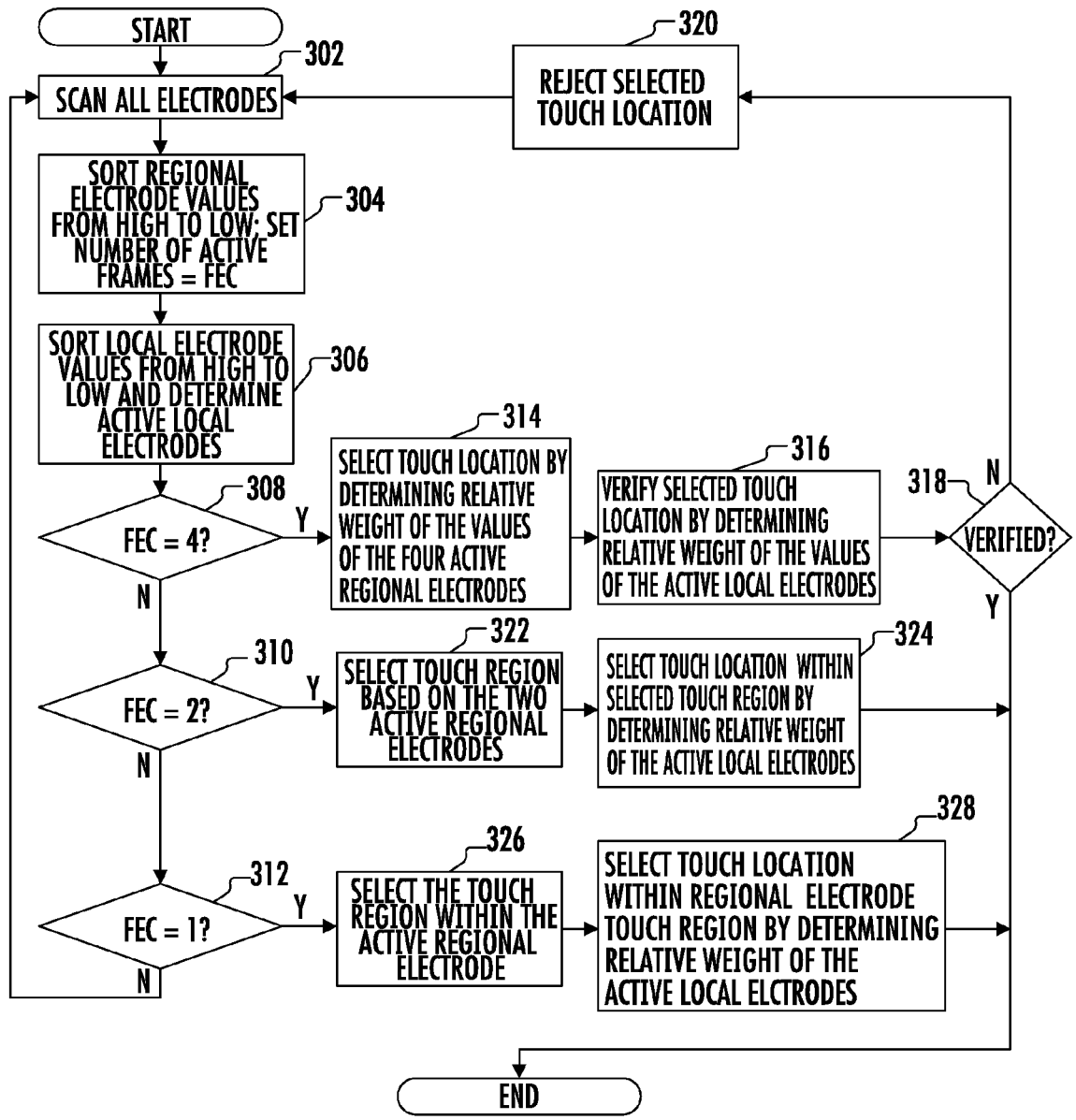
FIG. 3 is a flowchart diagram illustrating operation of the sensor circuit of FIG. 1 according to an exemplary embodiment for identifying a specific touch location within the touch screen surface area of the touch sensor panel of FIG. 1.

FIG. 3 is a flowchart diagram illustrating operation of the sensor circuit 110 according to an exemplary embodiment for identifying a specific touch location within the touch screen surface area 108 of the touch sensor panel 104. At a first block 302, the local electrodes E1-E4 and the regional electrodes E5-E8 are scanned to determine activation and activation values. As previously described, each of the regional electrodes and local electrodes have an initial or default value when not being touched. When a touch occurs, the capacitive value of at least one electrode is increased or otherwise changed. The electrode values are based on relative capacitive changes and activation is based on a minimum activity threshold value. At next block 304, the regional electrodes are sorted from high to low values, and the number of regional electrodes that are active are counted and set equal to a regional electrode count FEC. When the regional electrodes are sorted, the highest value (i.e., the highest change) is first followed by the rest in descending order from highest to lowest. Any regional electrodes with values above the minimum activity threshold value are considered active and any regional electrodes with values below the minimum activity threshold value are considered non-active. Only the active regional electrodes are counted and the total is set equal to FEC.

Operation proceeds to block 306 in which the local electrodes are sorted from high to low values, and the active local electrodes are determined. The process of sorting and determining activation of the local electrodes is substantially the same as for the regional electrodes. The active local electrodes may also be counted. Operation then proceeds to block 308 in which it is queried whether FEC=4 indicating that four regional electrodes are active. If not, operation proceeds to block 310 in which it is queried whether FEC=2 indicating that two regional electrodes are active. If not, operation proceeds to block 312 in which it is queried whether FEC=1 indicating that only one regional electrode is active. If not, operation returns to block 302 to again scan all of the electrodes and operation loops between blocks 302 and 312 while the touch sensor panel 104 is not touched.

If FEC=4 as determined at block 308, then a touch has been detected at a center touch region between the four regional electrodes E5-E8. For the touch sensor panel 202, for example, when all four of the regional electrodes E5-E8 are active such that FEC=4, then the touch is within the center touch region 222. If so, operation proceeds to block 314 in which the specific touch location is selected by determining relative weight of the values of the four active regional electrodes. In order to determining relative weight of the values of the regional electrodes, the regional electrode with the highest value is assigned a relative percentage ratio of 100%. Relative percentage ratios are then applied to the remaining active regional electrodes and a location decision is determined based on the relative ratios of the active regional electrodes. The location decision is primarily based on determining a mathematical "point of gravity" between the regional electrodes and identifying the closest touch location to the calculated point of gravity as further described below. In general, if the values of all four regional electrodes are roughly equal, then the touch location 24 is selected. If the value of any one electrode is significantly higher than the other three, then the corresponding one of the four corner touch locations of the touch region 222 is selected. For example, if the value of regional electrode E7 is significantly higher than the values of E5, E6 and E8, then touch location 100 is selected. If the values of two regional electrodes are relatively high and roughly equal and the values of the remaining two regional electrodes are relatively low and roughly equal, then the corresponding one of the side touch locations 99, 108, 109 and 118 is selected. For example, if the values of regional electrodes E6 and E8 are high and roughly equal and the values of regional electrodes E5 and E7 are low and roughly equal, then the touch position 118 is selected.

Operation then proceeds to block 316 in which the touch location determined by the relative weight of the four active regional electrodes is verified by the relative weight of the values of the active local electrodes. Presumably, if the touch location is within the touch region 222, then the corresponding local electrodes at the corresponding corners of the active regional electrodes are also active. For the touch sensor panel 202, for example, a touch within touch region 222 activates all four of the regional electrodes E5-E8, which should also activate all four of the local electrodes E1-E4. Furthermore, the touch location determined by the relative weight of the local electrodes should correspond with the touch location determined by the relative weight of the regional electrodes. Operation proceeds to block 318 to determine whether the same touch location was indicated by the relative weight among both regional and local electrodes. If verified, then the current selection process is completed. If not verified, such as when the regional electrode point of gravity significantly deviates with the local electrode point of gravity and two different touch locations are indicated, operation proceeds instead to block 320 in which the currently selected touch location is rejected. If the touch location was not verified, a possible error condition or misread condition exists, so that operation returns to block 302 to perform another scan procedure. After a successful scan procedure, operation may be transferred to other functions (not shown) or may return back to block 302 to begin a new scan operation depending upon the particular configuration or mode of operation.

If instead FEC=2 as determined at block 310, operation proceeds to block 322 in which one of the border touch regions is selected based on which regional electrodes are active. For the touch sensor panel 202, for example, touch region 224 is selected if only regional electrodes E5 and E6 are active, touch region 226 is selected if only regional electrodes E5 and E7 are active, touch region 228 is selected if only regional electrodes E7 and E8 are active, and touch region 230 is selected if only regional electrodes E6 and E8 are active. Operation then proceeds to block 324 in which the relative weight of the values of the active local electrodes is used to select the specific touch location within the selected touch region and operation for the current selection process is completed. For example, if touch region 228 is selected and all four local electrodes have roughly equal values, then the touch location 26 at the center of the touch region 228 is selected. In this case, the relative weight of the values of the local electrodes is used to identify the point of gravity within the selected touch region and the corresponding touch location is selected in a similar manner as described above for the relative weight of the regional electrodes. It is noted that the border touch regions 224-230 are larger (3×5 or 5×3 for 15 touch locations) compared to the center touch region 222 (3×3 for 9 touch locations). Yet the relative weighting process is similar. If the border touch region 228 is selected, for example, and if only local electrodes E1 and E2 are active, then only one of the touch locations 101, 25 or 120 is selected. The relative weight between the local electrodes E1 and E2 is used to distinguish between these three touch locations.

If instead FEC=1 as determined at block 312, operation proceeds to block 326 in which the touch region within the sole active regional electrode is selected. For the touch sensor panel 202, for example, touch region 232 is selected if only regional electrode E5 is active, touch region 234 is selected if only regional electrode E6 is active, touch region 236 is selected if only regional electrode E7 is active, and touch region 238 is selected if only regional electrode E8 is active. Operation then proceeds to block 328 in which the relative values of the active local electrodes are weighted to select the specific touch location within the selected touch region and operation for the current selection process is completed. For example, if touch region 234 is selected and all four local electrodes have roughly equal values, then the touch location 36 at the center of the touch region 234 is selected. Or if the values are not equal, the weighting process is used to select among the center 3×3 touch locations 56-58, 68, 69, and 75-77. If only two local electrodes are active, then a corresponding one of the border touch locations within the selected touch region is selected. If only one local electrode is active, then the center location of that local electrode within the selected regional electrode is selected. In any case, the relative weight of the values of the local electrodes identifies the point of gravity within the selected touch region and the corresponding touch location is selected.

FIG. 4 is a diagram of a pair of tables 402 and 404 filled in with values, activity status, rank and relative percentage ratio (R) for four local electrodes E1-E4 in table 402 and four regional electrodes in table 404 to further illustrate the weighting process. In table 402, the local electrode numbers (E#) E1, E2, E3, E4 are listed first followed by respective values 60, 150, 25 and 65 for a particular scan. Since all four values are above the predetermined minimum activity value, then all four local electrodes are active as indicated by activity status "A". The local electrode E2 has the highest value of 150 and thus is ranked number 1 and given a relative ratio of 100. The local electrode E4 has the next highest value of 65 and thus is ranked number 2. The local electrode E4 is given a relative ratio of 43 since the value of 65 is 43% of 150. The local electrode E1 has the next highest value of 60 and thus is ranked number 3 and given a relative ratio of 40, and the local electrode E3 has the lowest value of 25 and thus is ranked number 4 and given a relative ratio of 17. In table 404, the regional electrode numbers (E#) E5, E6, E7, E8 are listed first followed by respective values 130, 75, 3 and 1 for the same scan. Since the values of the regional electrodes E5 and E6 are above the predetermined minimum activity value, they are active as indicated by activity status "A". The values of the regional electrodes E7 and E8, however, are below the predetermined minimum activity value, so they are not active as indicated by activity status "NA". The regional electrode E5 has the highest value of 130 and thus is ranked number 1 and given a relative ratio of 100. The regional electrode E6 has the next highest value of 75 and thus is ranked number 2 and given a relative ratio of 58. The remaining non-active regional electrodes E7 and E8 are not ranked and are not given relative ratios since otherwise inapplicable.

FIG. 5 is a figurative block diagram illustrating a weighting process according to one embodiment using the numeric values from the tables 402 and 404 as applied to the touch sensor panel 202 to locate a point of gravity 504 used for selecting the corresponding touch location 94. According to the flowchart of FIG. 3 as applied to the touch sensor panel 202, since there are only two active regional electrodes E5 and E6 so that FEC=2, then at block 322 the border touch region 224 is selected. FIG. 5 shows the touch region 224 including the touch locations 93-97, 21-23, 106, 107, and 112-116 along with the surrounding local electrodes E1, E2, E3 and E4 in the lower-left, upper-left, lower-right and upper-right positions, respectively, according to the local electrode ordering of the touch sensor panel 202. Although the value of E5 is larger than the value of E6 so that one of the touch locations 93-97 is likely to be selected, the relative values of the regional electrodes E5-E8 does not provide sufficient information to distinguish between these touch locations. A normalized weighting grid 502 is superimposed on the local electrodes E1-E4 having a center point with coordinates X,Y=0,0 located at the center of touch location 22. The upper-left corner of the grid 502 is located at about the center of local electrode E2 with corresponding coordinates X,Y'-1,-1. Likewise, the upper-right corner of the grid 502 is located at about the center of local electrode E4 with corresponding coordinates X,Y=1,1, the lower-left corner of the grid 502 is located at about the center of local electrode E1 with corresponding coordinates X,Y=-1,1, and the lower-right corner of the grid 502 is located at about the center of local electrode E3 with corresponding coordinates X,Y=1,-1.

The X coordinate of the center of gravity 504 is calculated by adding the relative ratios of the local electrodes E4 and E3 and subtracting the relative ratios of the local electrodes E1 and E2 and dividing the total by a total ratio value (RTOT) according to the following equation (1):

$$X = \frac{RE4 + RE3 - RE2 - RE1}{RTOT} \quad (1)$$

in which the RE# is the ratio of local electrode E# from table 402. RTOT=100+43+40+17=200. The ratios of electrodes E3 and E4 are added since in the positive X direction whereas the ratios of the local electrodes E1 and E2 are subtracted since in the negative X direction for determining the X coordinate. Thus, the X coordinate is calculated as X=(43+17−100−40)/200=−0.4. The Y coordinate is determined in a similar manner except that the ratios of local electrodes E2 and E4 are added since in the positive Y direction while the ratios of E1 and E3 are subtracted since in the negative Y direction. In this manner, the Y coordinate is calculated according to the following equation (2):

$$Y = \frac{RE4 + RE2 - RE3 - RE1}{RTOT} \quad (2)$$

Plugging in the values from table 402 yields Y=(43+100−17−40)/200=0.433. Thus, the center of gravity is plotted at a point 504 at location X,Y=−0.4, 0.433 as shown. The calculated center of gravity 504 is within the touch location 94 so that touch location 94 is selected at block 324. A similar weighting process among the regional electrodes or local electrodes to identify any touch location within any of the touch regions.

Each set of local electrodes within each regional electrode covers a 5×5 array of touch locations for a total of 25 touch locations. The touch locations 232, 234, 236 and 238 within the corresponding regional electrodes E1-E4 of the touch sensor panel 202, for example, each include 25 touch locations. Each side-by-side pair of regional electrodes E1-E4 enables coverage of an additional 3×5 array of touch locations. The border touch locations 224, 226, 228 and 230 between each pair of the regional electrodes, for example, each include 15 touch locations. Furthermore, 2×2 matrix of four regional electrodes enables detection of an additional 3×3 array of touch locations. The center touch region 222, for example, includes an additional 9 touch locations. Thus, a 2×2 matrix of regional electrodes, each including a 2×2 matrix of repeated local electrodes, enables detection of 25×4+15×4+9=169 touch locations as illustrated using a total of only eight electrodes. It is contemplated that the weighting function potentially enables more accurate point of gravity detection to thereby potentially increase the total number of touch locations. Increased touch screen accuracy, however, is counterbalanced by relative human error, particular for smaller screens and/or finger touch applications. The particular configuration is particularly advantageous for location selection by a human or the like. An application employing a conductive pen or pointer or wand or the like may enable increased touch location density. In any event, it is appreciated that conventional capacitive-type touch sensors with N electrodes are typically limited to detecting N(N+1)/2 touch locations. Thus, such a conventional configuration with only 8 electrodes would be limited to about 36 touch locations. Using the regional and local electrode structure along with the weighting process as described herein allows accurate detection of at least 169 locations, which is an increase of over four times (~4.7x) that of the conventional configuration.

Figure 6:
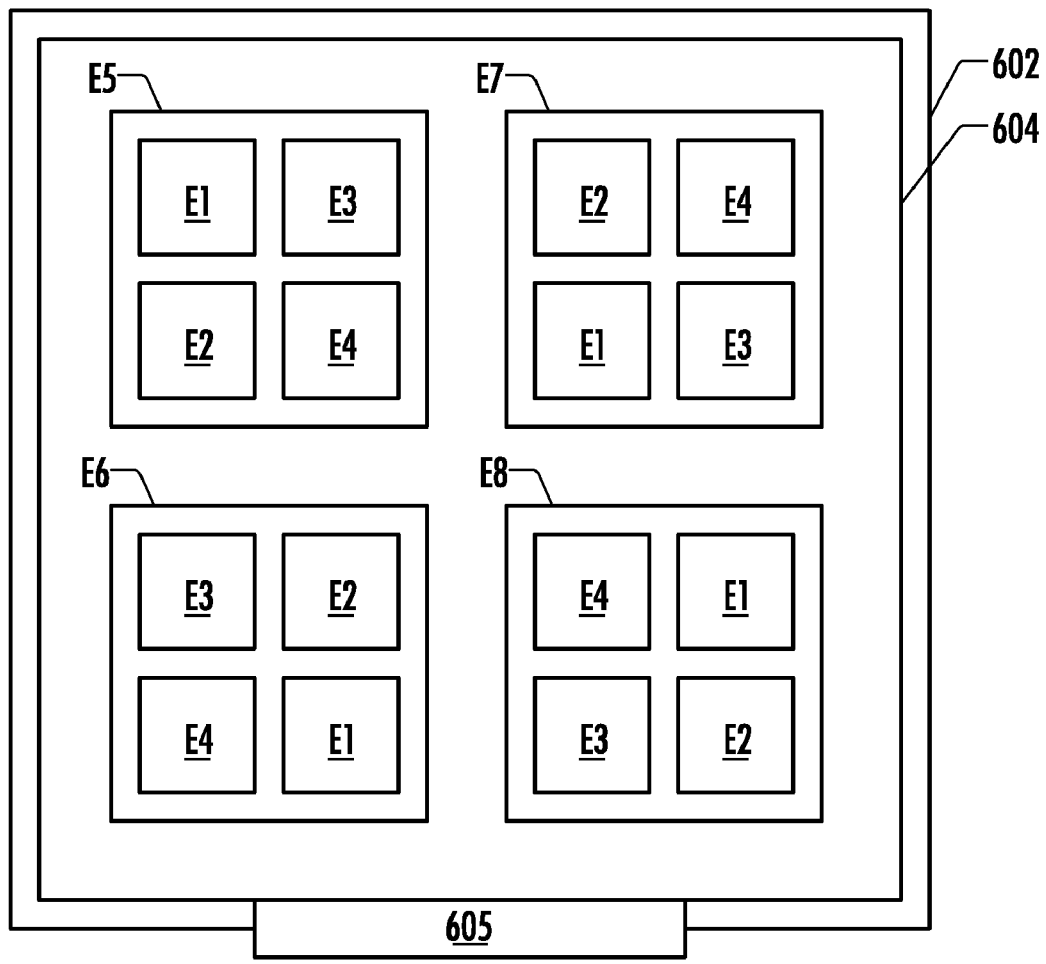
FIG. 6 is a simplified diagram of a touch sensor panel implemented according to another embodiment with different local electrode ordering which also may be used as the touch sensor panel of FIG. 1.

FIG. 6 is a simplified diagram of a touch sensor panel 602 implemented according to another embodiment which also may be used as the touch sensor panel 104. The touch sensor panel 602 includes a touch screen surface area 604 and an electrical connector interface 605 and is shaped and configured in substantially similar manner as the touch sensor panel 202 including the local electrodes E1-E4 and the regional electrodes E5-E8. The specific touch locations are not shown for clarity of illustration, but may be the same as those for the touch sensor panel 202. The ordering or sequence of the local electrodes E1-E4 within the regional electrodes E5-E8 of the touch sensor panel 602, however, is modified for ensuring accurate touch sensing. The regional electrode E5 of the touch sensor panel 602 includes the local electrodes E1-E4 positioned in the same manner as the regional electrode E5 of the touch sensor panel 202. In particular, the local electrodes E1-E4 in both regional electrode E5 are organized as E1, E2, E3 and E4 in the upper-left, lower-left, upper-right, and lower-right positions, respectively. In the touch sensor panel 202, this same sequential ordering was used for each of the regional electrodes E5-E8 for simplicity. It is observed that this sequential ordering of the local electrodes of the touch sensor panel 202 causes multiple pads of the same local electrode to be repeated within the same row or column. Note that the local electrodes along the left side of the touch sensor panel 202 has the pattern E1, E2 in regional electrode E5 and E1, E2 within the regional electrode E6, so that the pattern E1, E2 repeats in the first column along the left side. It is noted that similar repeating patterns occur along each row and each column of the local electrodes of the touch sensor panel 202 (e.g., E1, E3 along the top row, E2, E4 along the second row, etc.) of the touch sensor panel 202.

In the touch sensor panel 602, the local electrodes E1-E4 within the regional electrode E6 are organized as E3, E4, E1, E2 in the corresponding upper-left, lower-left, upper-right, and lower-right positions, respectively. Also, the local electrodes E1-E4 within the regional electrode E7 are respectively organized as E2, E1, E4, E3, and the local electrodes E1-E4 within the regional electrode E8 are respectively organized as E4, E3, E1, E2. In this manner, local electrode pairs do not repeat across the rows and columns of the touch sensor panel 602. For example, the pattern along the left column of the touch sensor panel 602 is E1, E2, E3, E4, the pattern along the second column of the touch sensor panel 602 is E3, E4, E2, E1, the pattern along the top row of the touch sensor panel 602 is E1, E3, E2, E4, the pattern along the bottom row of the touch sensor panel 602 is E4, E1, E3, E2, and so on.

It is noted that this re-ordering of the sequence of the local electrodes within the regional electrodes results in several location determination changes. As an example, note that the local electrode E4 at the lower-right corner of regional electrode E5 is diagonally positioned with respect to the common local electrode E4 at the upper-left corner of the regional electrode E8. Thus, a touch at the very center of the touch sensor panel 602 does not activate the local electrode E3, but instead activates two separate pads of the same local electrode E4. In this manner, the value of the local electrode E4 for a touch at the center of the touch sensor panel 602 is twice that of the value of the local electrode E4 for a touch at the center of the touch sensor panel 202. Yet the relative values between the regional electrodes E5 and E8 are used to distinguish between the specific locations of the touch so that such diagonal duplication of the local electrodes is inconsequential. Similar situations exist for the pads of the local electrode E1 between the regional electrodes E7 and E8, and for the pads of the local electrode E2 between the regional electrodes E5 and E6. In this case, the relative values of the regional electrodes E7 and E8 or between E5 and E6 are used to distinguish the touch locations within the regional electrode border regions.

Figure 7:
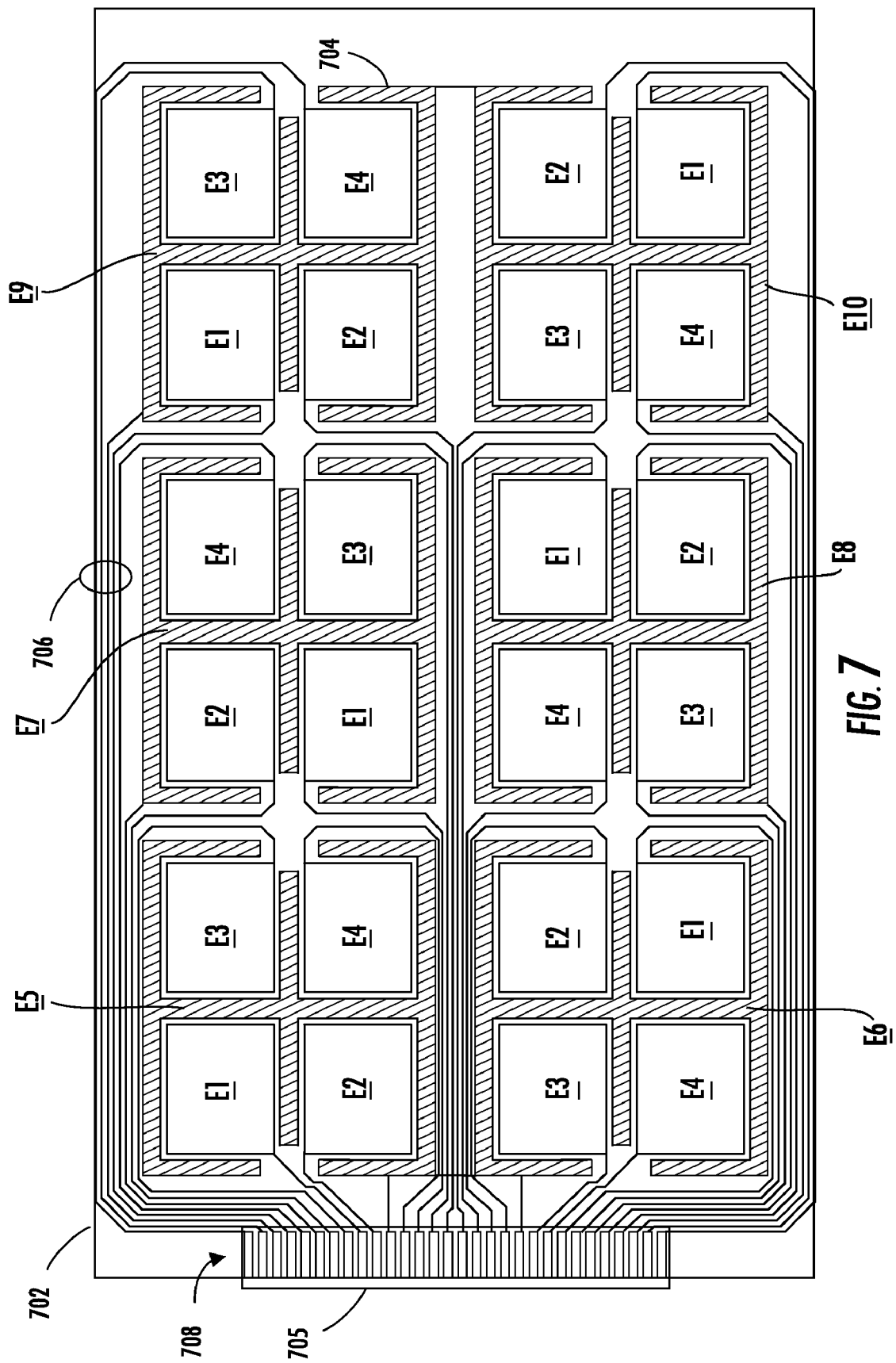
FIG. 7 is a more detailed diagram of a touch sensor panel according to another embodiment which also may be used as the touch sensor panel of FIG. 1.

FIG. 7 is a more detailed diagram of a touch sensor panel 702 according to another embodiment which also may be used as the touch sensor panel 104. The touch sensor panel 702 is shown with a touch screen surface area 704 and an electrical connector interface 705. The touch sensor panel 702 is organized in a similar manner as the touch sensor panels 202 and 602 including local electrodes E1-E4 and regional electrodes E5-E10, except that two additional regional electrodes E9 and E10 are included for a longer screen panel. Each of the regional electrodes E5-E10 includes four rectangular pads, one for each of the local electrodes E1-E4. Conductive pad areas are illustrated using shading. Each regional electrode is configured with a conductive cross-shaped pad between its local electrode pads, where the cross-shaped pad is further coupled to or integrally formed with conductive peripheral pads surrounding the local electrode pads. Thus, each regional electrode is configured with a similar pattern as a four-pane window frame. In this manner, each regional electrode includes portions between and around the local electrodes, without electrically contacting the local electrodes so that a touch anywhere within a regional electrode activates that regional electrode along with at least one of its local electrodes.

Multiple conductive traces 706 are routed between each electrodes E1-E10 and a corresponding one of multiple connective pin pads 708 incorporated onto a connector area 705. The conductive traces 706 are shown significantly larger than in an actual configuration for purposes of clarity of illustration. In the illustrated embodiment, a separate one of the conductive traces 706 is routed between each pad of each of the local electrodes E1-E4 and a corresponding one of the connective pin pads 708. Also, a separate conductive trace 706 is routed between each of the regional electrodes E5-E10 and a corresponding pin pad 708. Since there are 6 regional electrodes and 24 local electrode pads, the touch sensor panel 702 includes a total of 30 conductive traces 706 each routed to a corresponding one of 30 connective pin pads 708. Although not specifically shown, each of the pads of each local electrode are electrically coupled together as a single local electrode within a corresponding sensor circuit, such as the sensor circuit 110. The sequential ordering of the local electrodes E1-E4 within the regional electrodes E5-E8 of the touch sensor panel 702 follows the same sequential ordering as shown on the touch sensor panel 602, and the last two regional electrodes E9 and E10 have the same local electrode sequential ordering as the regional electrodes E5 and E7.

In one embodiment, the conductive electrode pads, traces 706, and pin pads 708 are formed as thin films of conductive material deposited or coated on the surface of the touch sensor panel 702, which is made of an insulator material, such as plastic or glass or the like. One such conductive material is indium tin oxide (ITO), which has both conductive and optical transparency properties suitable for capacitive touch screens, although other suitable materials are possible and contemplated. The conductive material is deposited according to any one of many suitable methods, including, for example, electron beam evaporation, physical vapor deposition, various forms of sputter deposition, etc. The conductive pads which form the regional electrodes and the local electrodes are made sufficiently large to create a relatively large capacitance level suitable for touch sensing. The conductive traces 706 are significantly thinner than the electrode pad areas to provide sufficient conductivity between the electrode pads and pin pads without significantly increasing capacitance to enable accurate sensing. The conductive pin pads 708 have sufficient area to enable electrical contact with control or sensor circuitry, such as, for example, the sensor circuit 110. It is noted that the resistivity of the conductive material may cause variations in impedance so that certain layout-specific corrections may be applied to eliminate any effects of different trace lengths and the like.

In one embodiment, each of the conductive pads forming the local electrodes E1-E4 of the touch sensor panel 702 roughly corresponds with the size of a human finger touch, so that the relative touch location density of the touch sensor panel 702 corresponds with the density of the touch sensor panel 202 providing a total of about 260 different touch locations within the touch screen surface area 704.

Figure 8:
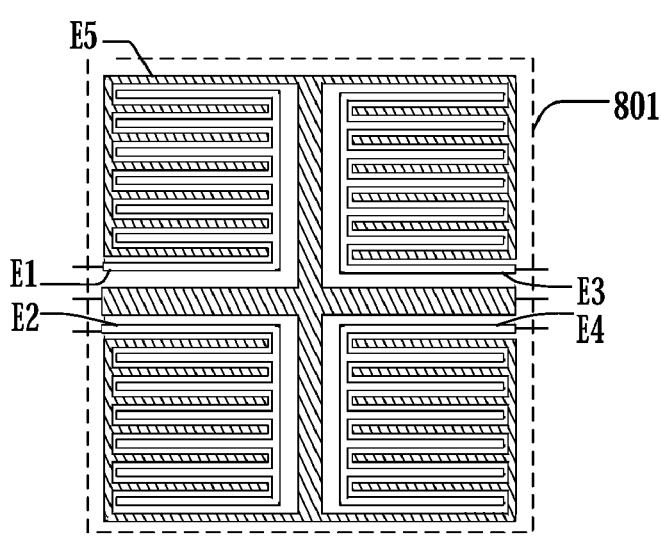
FIG. 8 is a simplified figurative diagram of an alternative embodiment of the regional electrode E5 covering a particular region and corresponding pads of local electrodes E1-E4 located within the regional electrode E5.

FIG. 8 is a simplified figurative diagram of an alternative embodiment of the regional electrode E5 covering a region 801 and corresponding pads of local electrodes E1-E4 located within the regional electrode E5. In this embodiment the regional electrode E5 and each of the local electrodes E1-E4 are configured as conductive strips electrically coupled together to cover corresponding areas within the region 801. The conductive strips of the regional electrode E5 are routed so that a touch anywhere within or immediately surrounding the region 801 activates the regional electrode E5. The conductive strips of each of the local electrodes E1-E4 are interlaced with while also isolated from corresponding conductive strips of the regional electrode E5 in the corresponding four quadrant areas of the region 801. FIG. 8 illustrates that many variations are possible for implementing regional and local electrodes.

An input sensor for an electronic device according to one embodiment includes a touch sensor panel, multiple electrodes and a sensor circuit. The electrodes include multiple regional electrodes and multiple local electrodes distributed across the touch sensor panel. Each regional electrode covers a corresponding region of the touch sensor panel so that a touch anywhere along the touch sensor panel is detected by at least one regional electrode. Each local electrode includes multiple pads distributed within the regional electrodes so that each regional electrode includes at least one pad of each of the local electrodes. The local electrodes are distributed so that a touch anywhere across the touch sensor panel is detected by at least one local electrode. A sensor circuit determines a value for each of the electrodes indicating relative change, and compares relative values of the electrodes to identify a location of a touch of the touch sensor panel.

In one embodiment the touch sensor panel is a capacitive-type sensor and each value is a relative capacitive change of the electrodes. In one embodiment, each regional electrode includes one pad of each of four local electrodes. In one embodiment, the sensor circuit determines active ones of the electrodes as those having a value which is greater than a minimum activity threshold. In various embodiments, if four regional electrodes are active, a center touch region is identified between the four active regional electrodes and the sensor circuit determines relative weight of the values of the regional electrodes to determine a point of gravity within the center touch region. If only two of the regional electrodes are active, a border touch region is identifying between the two active regional electrodes and the sensor circuit determines relative weight of the values of the active local electrodes to determine a point of gravity within the border touch region. If only one regional electrode is active, an internal touch region is identified within the active regional electrode and the sensor circuit determines the relative weight of the values of the active local electrodes to determine a point of gravity within the internal touch region. In one embodiment, the pads of the local electrodes are sequentially ordered relative to each other to ensure distinction of touches within any of the regional electrodes from touches between any of the regional electrodes.

An electronic device according to one embodiment includes a touch sensor panel and a sensor circuit. The touch sensor panel includes regional electrodes and local electrodes distributed across the touch sensor panel. The regional electrodes are distributed for distinguishing a touch within or between each of multiple regions of the touch sensor panel. Each local electrode includes multiple pads distributed within the regional electrodes so that each regional electrode includes at least one pad of each local electrode and a touch anywhere across the touch sensor panel is detected by at least local electrodes. The sensor circuit senses changes of any of the electrodes and compares relative changes of the electrodes to identify a corresponding touch location of the touch sensor panel.

A method of determining a touch location along a touch area of a touch sensor panel according to one embodiment includes providing multiple electrodes including regional electrodes and local electrodes, locating each of the regional electrodes within a corresponding one of multiple regions of the touch area so that each region includes one regional electrode and so that a touch anywhere along the touch area is detected by at least one regional electrode, dividing each of the local electrodes into multiple electrically-coupled touch pads, distributing the touch pads of each local electrode within the regional electrodes so that each regional electrode includes a touch pad of each local electrode and so that a touch anywhere along the touch area is detected by at least one local electrodes, and determining the touch location by determining which of the regional electrodes are changed above a minimum activity threshold and by relative weight of the changes of the electrodes.

The method may include detecting four active regional electrodes and the relative weight of changes of the four active regional electrodes to determine a point of gravity within a center touch region between the four electrodes. The method may include detecting only two active regional electrodes and by determining relative weight of changes of the local electrodes to determine a point of gravity within a border touch region between the two active regional electrodes. The method may include detecting only one active regional electrode and determining relative weight of changes of the local electrodes to determine a point of gravity within the active regional electrode.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. An input sensor for an electronic device, comprising:
    a touch sensor panel having a first dimension and a second dimension;
    a plurality of electrically-isolated electrodes distributed across said touch sensor panel, wherein said plurality of electrodes comprises a plurality of regional electrodes and at least four local electrodes;
    wherein each of said plurality of regional electrodes covers a corresponding one of a plurality of regions of said touch sensor panel, wherein each of said plurality of regional electrodes extends no more than half of said first dimension and no more than half of said second dimension, and wherein a touch anywhere along said touch sensor panel is detected by at least one of said plurality of regional electrodes;
    wherein each of said at least four local electrodes comprises a plurality of electrically-connected pads distributed within said plurality of regional electrodes so that each of said plurality of regions covered by a regional electrode includes at least one pad of each of said at least four local electrodes, wherein a touch anywhere across said touch sensor panel is detected by at least one of said at least four local electrodes; and
    a sensor circuit which determines a value for each of said plurality of electrodes indicating relative change, and which compares relative values of said plurality of electrodes to identify a location of a touch of said touch sensor panel.

2. The input sensor of claim 1, wherein said sensor circuit determines said value comprising a relative capacitive change of each of said plurality of electrodes.

3. The input sensor of claim 1, wherein each of said plurality of regions comprises a rectangular-shaped area with four quadrants, wherein each of said at least four local electrodes comprises a conductive pad located within a corresponding one of said four quadrants of a corresponding one of said plurality of regions, and wherein each of said plurality of regional electrodes comprises a plurality of conductive strips coupled together and surrounding a corresponding four conductive pads of corresponding ones of said at least four local electrodes.

4. The input sensor of claim 3, wherein each of said at least four local electrodes comprises a rectangular-shaped conductive pad located within said corresponding one of said four quadrants of a corresponding one of said plurality of regional electrodes.

5. The input sensor of claim 1, wherein said sensor circuit determines active ones of said plurality of electrodes as those having a value which is greater than a minimum activity threshold.

6. The input sensor of claim 5, wherein said sensor circuit determines that four of said plurality of regional electrodes are active identifying a center touch region between said four regional electrodes, and wherein said sensor circuit weighs relative values of said four regional electrodes to determine a point of gravity within said center touch region.

7. The input sensor of claim 5, wherein said sensor circuit determines that only two of said plurality of regional electrodes are active identifying a border touch region between said two regional electrodes, and wherein said sensor circuit weighs relative values of active local electrodes to determine a point of gravity within said border touch region.

8. The input sensor of claim 5, wherein said sensor circuit determines that only one of said plurality of regional electrodes is active identifying an internal touch region within said only one regional electrode, and wherein said sensor circuit weighs relative values of active local electrodes to determine a point of gravity within said internal touch region.

9. The input sensor of claim 1, wherein said plurality of pads of said at least four local electrodes are sequentially ordered relative to each other to ensure distinction of touches within any of said plurality of regional electrodes from touches between any of said plurality of regional electrodes.

10. An electronic device, comprising:
    a touch sensor panel having a first dimension and a second dimension, comprising:
        a plurality of electrically-isolated regional electrodes distributed across said touch sensor panel for distinguishing a touch within or between each of a plurality of regions of said touch sensor panel, wherein each of said plurality of regional electrodes extends no more than half of said first dimension and no more than half of said second dimension; and
        at least four electrically-isolated local electrodes distributed across said touch sensor panel, each comprising a plurality of electrically-connected pads distributed within said plurality of regional electrodes so that each of said plurality of regions covered by a regional electrode includes at least one pad of each of said at least four local electrodes, wherein a touch anywhere across said touch sensor panel is detected by at least one of said at least four local electrodes; and
    a sensor circuit which senses changes of any of said plurality of electrodes, and which compares relative changes of said plurality of electrodes to identify a corresponding touch location of said touch sensor panel.

11. The electronic device of claim 10, wherein said touch sensor panel comprises a capacitive-type touch sensor panel.

12. The electronic device of claim 1, wherein said sensor circuit determines active ones of said plurality of electrodes comprising a change above a minimum activity threshold.

13. The electronic device of claim 12, wherein said sensor circuit determines that four of said plurality of regional electrodes are active identifying a center touch region between said four regional electrodes, and wherein said sensor circuit weighs relative changes of said four regional electrodes to determine a point of gravity within said center touch region.

14. The electronic device of claim 12, wherein said sensor circuit determines that two of said plurality of regional electrodes are active identifying a border touch region between said two regional electrodes, and wherein said sensor circuit weighs relative changes of active local electrodes to determine a point of gravity within said border touch region.

15. The electronic device of claim 12, wherein said sensor circuit determines that only one of said plurality of regional electrodes is active identifying an internal touch region within said only one regional electrode, and wherein said sensor circuit weighs relative changes of active local electrodes to determine a point of gravity within said internal touch region.

16. A method of determining a touch location along a touch area of a touch sensor panel having a first dimension and a second dimension, comprising:
    providing a plurality of electrically-isolated electrodes comprising a plurality of regional electrodes and at least four local electrodes;

locating each of the plurality of regional electrodes within a corresponding one of a plurality of regions of the touch area wherein each region includes one regional electrode, wherein each regional electrode extends no more than half of the first dimension and no more than half of the first dimension, and wherein a touch anywhere along the touch area is detected by at least one of the plurality of regional electrodes;

dividing each of the at least four local electrodes into a plurality of electrically-coupled touch pads;

distributing the plurality of touch pads of each of the at least four local electrodes within the plurality of regional electrodes so that each of said plurality of regions covered by a regional electrode includes a touch pad of each local electrode, and so that a touch anywhere along the touch area is detected by at least one of the at least four local electrodes; and determining the touch location by determining which of the regional electrodes are changed above a minimum activity threshold and by weighing relative changes of the plurality of electrodes.

17. The method of claim 16, further comprising:
detecting four active regional electrodes; and
weighing relative changes of the four active regional electrodes to determine a point of gravity within a center touch region between the four active regional electrodes.

18. The method of claim 16, further comprising:
detecting only two active regional electrodes; and
weighing relative changes of the local electrodes to determine a point of gravity within a border touch region between the two active regional electrodes.

19. The method of claim 16, further comprising:
detecting only one active regional electrode; and
weighing relative changes of the local electrodes to determine a point of gravity within the active regional electrode.

20. The input sensor of claim 1, wherein said plurality of regional electrodes comprises six regional electrodes distributed in a two-by-three array of regional electrodes in which said first dimension comprises a length of three regional electrodes and in which said second dimension comprises a length of two regional electrodes, and wherein each of said at least four local electrodes comprises six pads in which one of said six pads is located in a corresponding one of said plurality of regional electrodes.

21. The electronic device of claim 10, wherein said plurality of regional electrodes comprises six regional electrodes distributed in a two-by-three array of regional electrodes in which said first dimension comprises a length of three regional electrodes and in which said second dimension comprises a length of two regional electrodes, and wherein each of said at least four local electrodes comprises six pads in which one of said six pads is located in a corresponding one of said plurality of regional electrodes.

22. The method of claim 16, wherein said plurality of regional electrodes comprises six regional electrodes distributed in a two-by-three array of regional electrodes in which said first dimension comprises a length of three regional electrodes and in which said second dimension comprises a length of two regional electrodes, and wherein each of said at least four local electrodes comprises six pads in which one of said six pads is located in a corresponding one of said plurality of regional electrodes.

* * * * *